Figure 1:
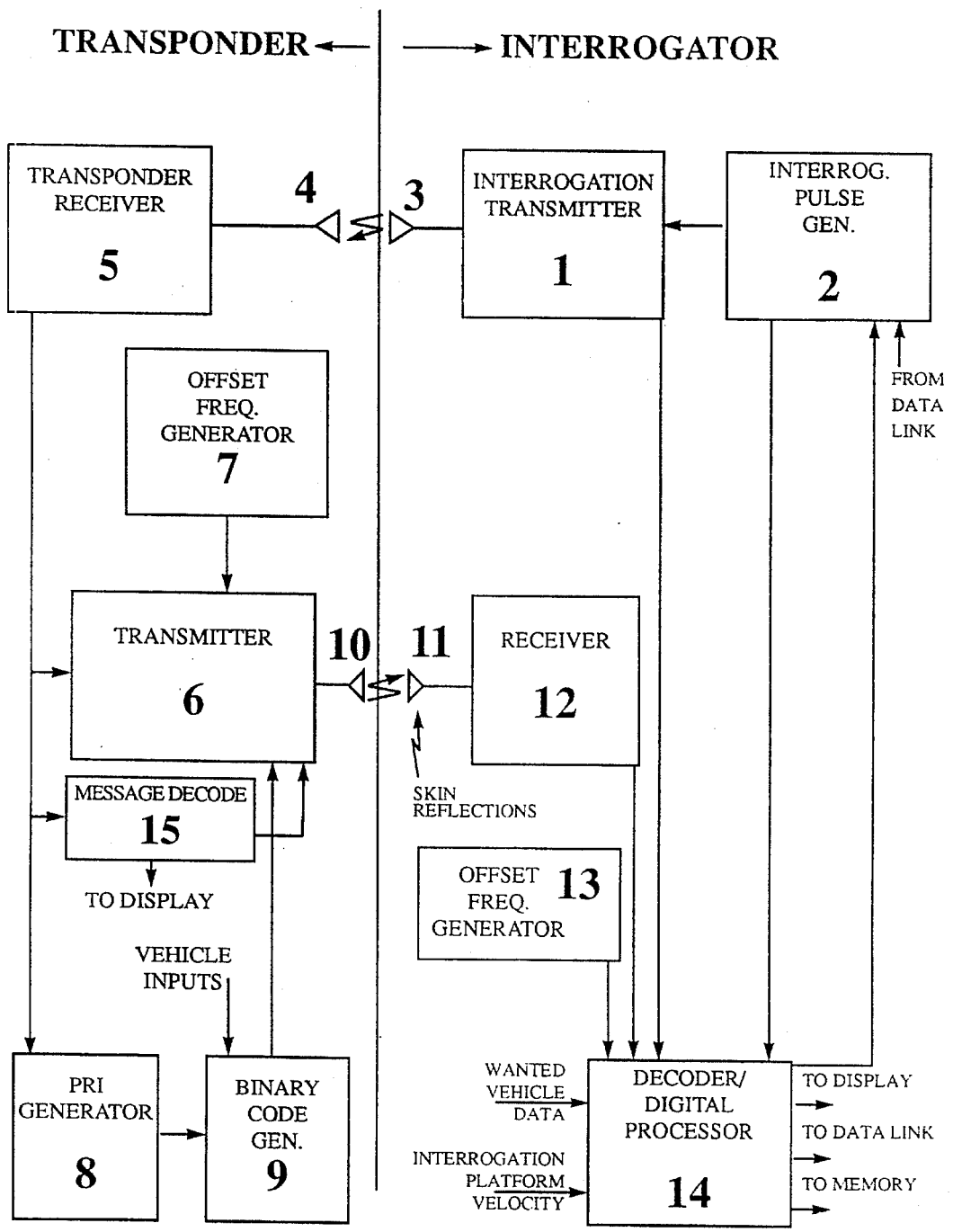

United States Patent [19]

Spiess

[11] Patent Number: 5,508,705
[45] Date of Patent: Apr. 16, 1996

[54] VEHICLE IDENTIFICATION CLASSIFICATION AND COMMUNICATION SYSTEM

[76] Inventor: Newton E. Spiess, 1379 SW. Albatross Way, Palm City, Fla. 34990

[21] Appl. No.: 179,521

[22] Filed: Jan. 10, 1994

[51] Int. Cl.$^6$ ................................................. G01S 13/80
[52] U.S. Cl. ............................ 342/44; 342/47; 342/50
[58] Field of Search ................................ 342/42, 44, 47, 342/50

[56] References Cited

U.S. PATENT DOCUMENTS

| | | | |
|---|---|---|---|
| 3,914,762 | 9/1976 | Bell | 342/44 |
| 3,964,024 | 10/1976 | Hutton | 340/152 |
| 4,001,822 | 1/1977 | Sterzer | 343/6.5 |
| 4,006,477 | 2/1977 | Yost, Jr. | 342/51 |
| 4,144,534 | 3/1979 | Prickett | 342/43 |
| 4,180,815 | 12/1979 | Hill | 342/43 |
| 4,278,977 | 7/1981 | Nossen | 342/42 |
| 4,339,753 | 7/1982 | Mawhinney | 342/44 |
| 4,740,792 | 4/1988 | Sagey | 342/457 |
| 4,818,998 | 4/1989 | Apsell | 342/44 |
| 5,014,061 | 5/1991 | Ghose | 342/45 |
| 5,124,699 | 6/1992 | Tervoert | 340/825.54 |
| 5,264,854 | 11/1993 | Spiess | 342/44 |
| 5,278,563 | 1/1994 | Spiess | 342/44 |
| 5,280,435 | 1/1994 | Weisshaupt et al. | 364/514 |
| 5,294,931 | 3/1994 | Meier | 342/44 |
| 5,410,315 | 4/1995 | Huber | 342/42 |

OTHER PUBLICATIONS

Merrell J. Skolnik, Radar Handbook 2nd Ed. 1990.

Primary Examiner—J. Woodrow Eldred

[57] ABSTRACT

An interrogator-transponder system in which multiple vehicle mounted transponders which may be closely spaced in distance and moving at similar velocities are interrogated by interrogation signals that are identical for all interrogations. Digital coded data blocks consisting of an address code and a message code are transmitted on the interrogation frequency and are interleaved with the interrogation signals. Transponders respond with a coherent identification code and a message data code signal that is displaced in frequency from the interrogation signal by an amount that is identical for each transponder. The transponders decode interrogator data blocks that are associated with an address that is identical to the transponder identification code. The response signal spacings in time are difference for each transponder but are always multiples of the pulse repetition interval of the interrogation signal. Means are provided in the interrogation device to determine the velocity of each transponder, its range with respect to the interrogator, its identity and the contents of the transponder messages. Means are also provided to determine the range and velocity of transponder and nontransponder-equipped vehicles using the vehicle skin reflection of the interrogation signal.

8 Claims, 3 Drawing Sheets

DECODER / DIGITAL PROCESSOR

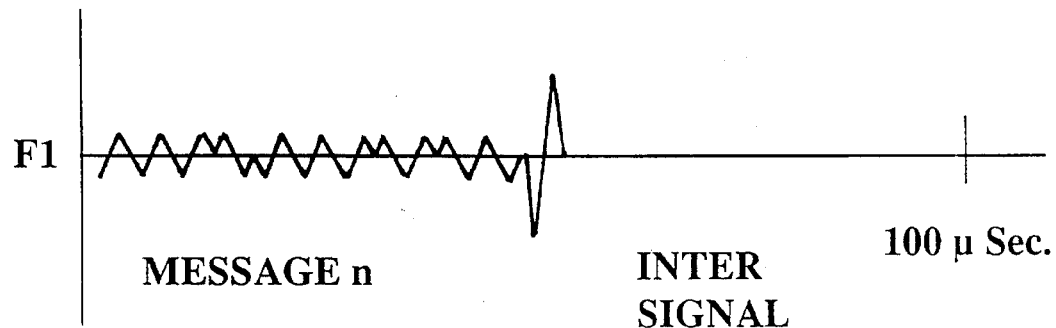
FIGURE 3A. INTERROGATOR TRANSMITTER
MESSAGE n    INTER SIGNAL    100 μ Sec.
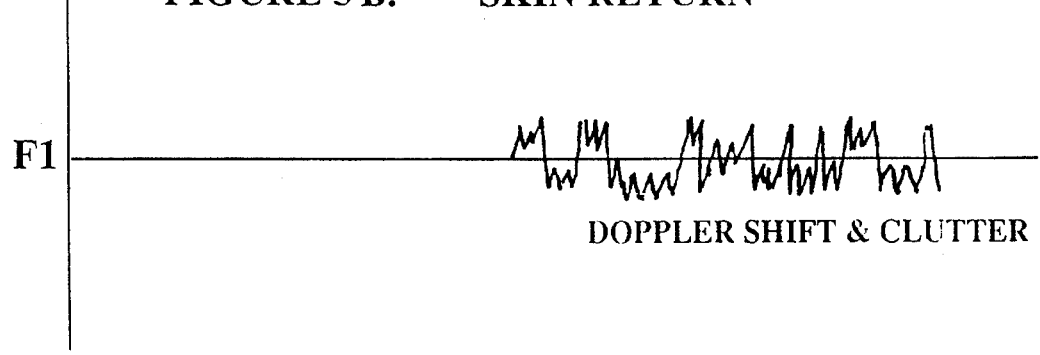
FIGURE 3B. SKIN RETURN
DOPPLER SHIFT & CLUTTER
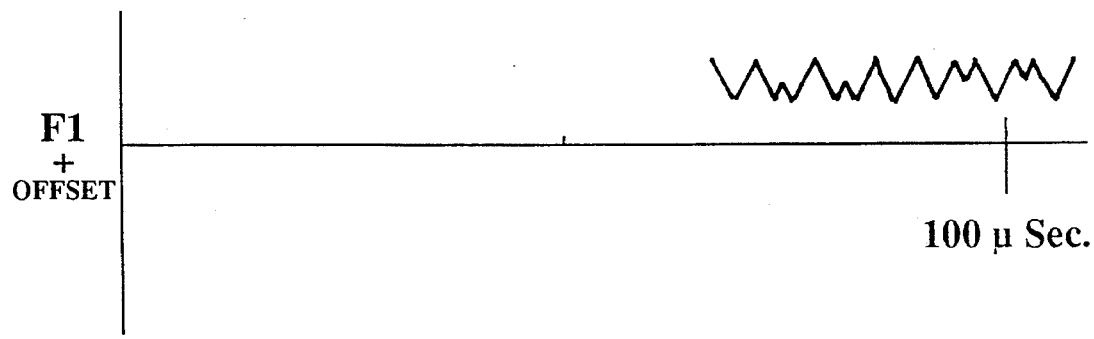
FIGURE 3C. TRANSPONDER RETURN
100 μ Sec.

VEHICLE IDENTIFICATION CLASSIFICATION AND COMMUNICATION SYSTEM

BACKGROUND—CROSS REFERENCE TO RELATED APPLICATIONS

This invention uses the multiple transponder response repetition interval (RRI) variation and elements of the coherent signal processing of my application Ser. No. 7/850,423 filed Mar. 12, 1992 and issued as U.S. Pat. No. 5,264,854 on Nov. 23, 1993. It uses the coherent detection means for offset frequency vehicle mounted transponders and elements of the associated skin return of transponder and non-transponder equipped vehicles of my copending application Ser. No. 07/941,716 filed Sep. 8, 1992.

BACKGROUND—FIELD OF INVENTION

This invention relates to coherent interrogator/offset frequency transponder systems in which multiple vehicle transponder identifying codes are rapidly determined by the interrogator and are associated with measured range and velocity of the transponders. Two way digital communication between the interrogator and specific transponders is provided using the same interrogation and response frequencies. The interrogation frequency vehicle skin return is also used to independently determine the range and velocity of transponder and nontransponder equipped vehicles. Data processing associated with the interrogators and transponders allows the system to satisfy or support the 27 planned User Services of the Department of Transportation Intelligent Vehicle/Highway System program.

BACKGROUND—DISCUSSION OF PRIOR ART

In the application Ser. No. 07/850,423 filed Mar. 12, 1992, means are described for determining the speed, range and an identification code of multiple transponder-equipped vehicles operating in high density highway environments and the classification of the vehicles according to criteria established by law enforcement authorities. In addition, the range of transponder and non-transponder equipped vehicles is determined using the skin reflection radar energy of the vehicles.

The application Ser. No. 07/941,716 filed Sep. 8, 1992 improved the capability of the prior system by introducing means for providing frequency separation between the interrogation signal and the transponder reply signal while retaining the phase coherent signal detection and information transfer characteristics of the interrogator transponder and skin return loops.

The system of application Ser. No. 07/941,716 has proven to be effective in the most complex environments involving multiple closely spaced interrogators and transponders. The dual data stream consisting of vehicle identifications codes and associated transponder velocities and ranges plus the primary radar skin return derived ranges and velocities has proved capable of reducing the frequency and severity of highway accidents that presently cost the lives of nearly 40,000 persons, severely injure 200,000 and cause an economic loss of approximately 137 billion dollars per year. For example, the ability to monitor the velocity and range of vehicles moving along extended lengths of highway makes it possible to warn motorists in real time of slow traffic ahead thus reducing the possibility of multiple rear end collisions. Police can use the identification speed and location information to identify wanted vehicles without resorting to high speed chases with flashing lights and wailing sirens.

This system can be made more effective if means are provided for establishing fast response two-way communications between specific selected vehicles and their operating environment. For example, analysis shows that SLOW DOWN warnings must be transmitted to drivers approaching an accident situation within 1 second of the occurrence if involvement of following vehicles is to be avoided. In another example, a young mother whose car is being hijacked and who is about to be dragged to her death must be able to generate a MAY DAY message that will notify police of her vehicles's identity and location and the police in turn must be able to address a message to that specific vehicle which will stop it in its tracks.

Prior art systems, including the related Spiess applications, required separate systems to establish the required two-way communications and these have been found deficient in one or more respects.

Changeable overhead signs allow information to be transmitted to drivers but not from the driver to the roadside environment. Furthermore the time delay in information transfer far exceeds the requirements for accident avoidance and mitigation.

Cellular phones can provide the required two-way communication but the response time is far too slow. Expensive additional equipment is required in all vehicles.

Area radio stations can convey important information to motorists but they lack the capability for two-way communication and cannot address specific information to specific vehicles at specific locations.

A variety of two-way digital data links have been considered, many of which could provide the required response time and could address information to specific vehicles. They have been found lacking in that they require additional hardware on the vehicles and at the interrogator locations, require allocation in the radio frequency spectrum and impose unacceptable data transfer requirements on the systems

OBJECTS AND ADVANTAGES

Accordingly, besides the objects and advantages of the interrogator transponder system of my applications, Ser. No. 7/850,423 and Ser. No. 7/941,716, several objects and advantages of the present invention are:

a—to provide means for transmitting digital data from the interrogation devices to specific transponders that are within range of the interrogation devices while preserving the interrogation device capability to interrogate the transponders, receive and process coherent coded signals from the transponders so as to derive transponder identification range and velocity and to receive and process skin returns from vehicles within range of the interrogation devices so as to derive vehicle range and velocity.

b—to provide means in the interrogators for modulating the interrogation device signal with a transponder identification code and a message code that is to be addressed to the specific transponder that is programmed with that code.

c—to provide means in the transponder for recognizing its particular identification code when that code is received as part of an interrogation signal and decoding the associated message code as required for driving display devices within the vehicle to which the transponder is attached or for performing other functions related to vehicle operation.

d—to provide means in the transponders for encoding the transponder response with a message code that is in additional to the unique transponder identification code.

e—to provide means in the interrogator devices for decoding the transponder message codes and associating those messages with the identification, velocity and range that are derived from that particular transponder response.

f—to provide programmable means in the interrogation devices which will cause the effective range of both the interrogator and transponder to vary from short to long range, thus allowing the devices to be used for a greater variety of purposes without excessive mutual interference.

Further objects and advantages of the invention are to process the information derived from the transponder returns and the vehicle skin reflections as required to support traffic management and control functions.

DRAWING FIGURES

FIG. 1 shows, on the right side, the components of the interrogation device which may be mounted on a movable surveillance platform such as a police car or aircraft or may be mounted on a fixed support such as a traffic control site or a toll collection station.

FIG. 1 shows, on the left side, the components of the transponder device, one of which will be mounted on individual vehicles or other movable devices authorized to operate within the surveillance space.

Figure 2:
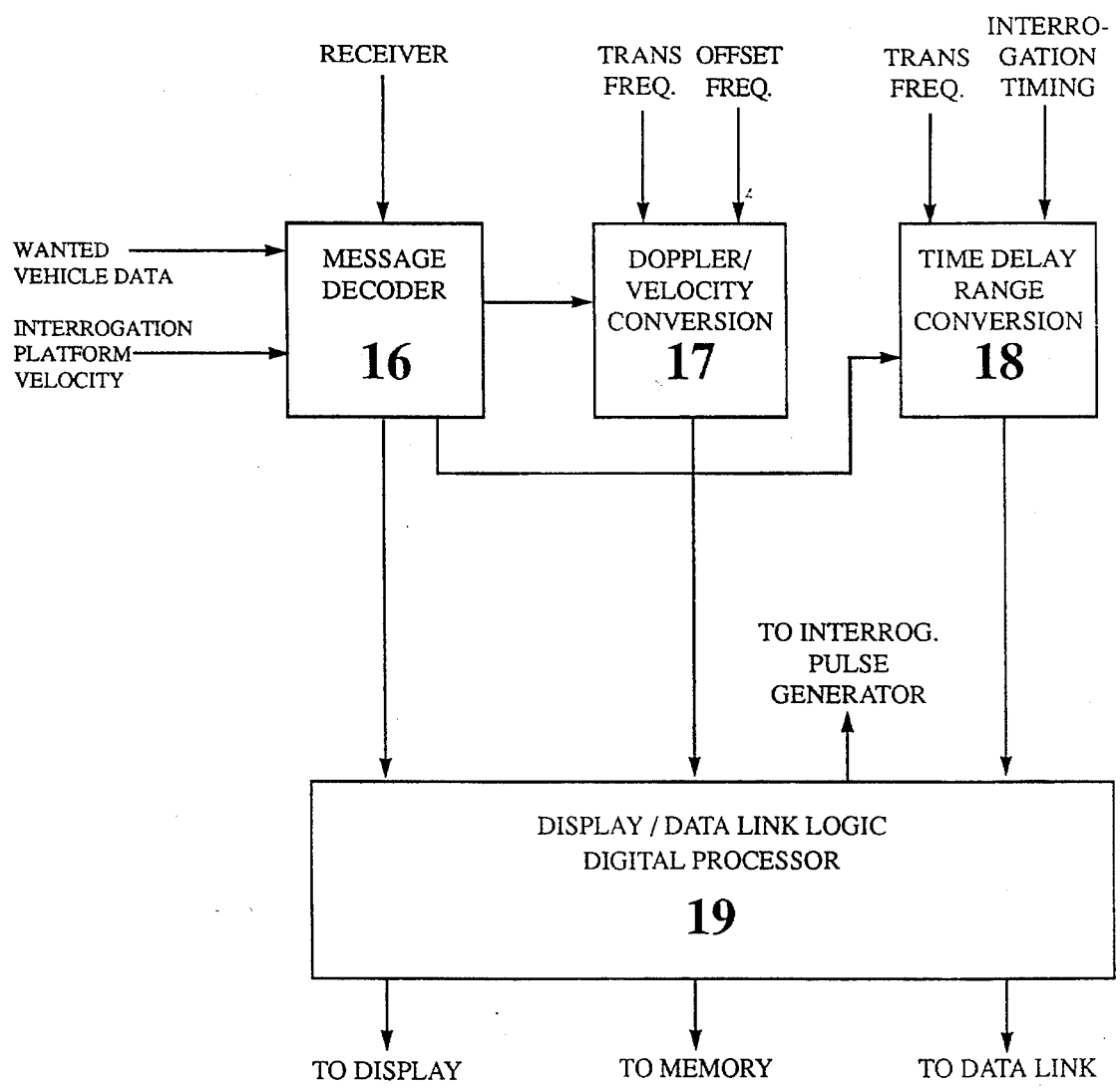

FIG. 2 shows the details of the decoder/digital processor element of the interrogator which processes the received transponder signals and which in turn outputs a stream of identification codes, transponder messages and the associated speed and location of the vehicles on which the transponders are mounted. In addition it outputs the range and speed of all vehicles based on processing of vehicle skin returns.

FIGS. 3A, 3B, and 3C show the three RF time lines which are relevant to system operation. These are:

a—The interrogator transmitter time line which includes an address message, an information message and an interrogation signal.

b—The skin return which includes the reflected energy from both stationary and moving radar reflective objects.

c—The transponder return which includes digitally encoded transponder identification information and digitally encoded information relevant to the vehicle on which the transponder is mounted.

DESCRIPTION

A typical embodiment of the present invention is illustrated in FIG. 1, FIG. 2 and FIG. 3.

Referring to FIG. 1, the transmitter 1 transmits a modulated coherent signal through antenna 3 under control of the interrogation pulse generator 2. The signal at frequency F1 may be of sufficient spectral purity to prevent significant frequency variation over a period of time greater than the settling time of the doppler conversion devices that are a component of the decoder/digital processor 14 and the receiver 12.

The typical transmitted wave form is illustrated in FIG. 3a. It consists of two elements.

a—A binary coded message which itself consists of a transponder address and a binary coded message containing information addressed to a particular transponder. This portion of the wave form is transmitted at a power level sufficient to exceed the threshold sensitivity of multiple essentially identical transponders at a range for which the interrogator has been programmed. For an interrogator repetition interval of 100 μsec., pulse repetition rate of 10,000 per sec., this message may typically be 50 μsec. in duration using a bi-phased form of modulation. Transponder addresses and the associated message may be different during successive repetition intervals so that 10,000 messages may be addressed to individual transponders within one second.

b—An interrogation signal is transmitted typically immediately following the message code. This may be a short pulse transmitted at an amplitude sufficient to generate skin reflections that will produce an adequate signal to noise ratio at the receiver 12. This amplitude will be a function of the maximum range for which the interrogator is programmed and the size of the smallest moving objects which the interrogator is designed to detect. Alternatively a bi-phase code possessing good range sidelobe properties may be transmitted after the message code. This code like the short pulse interrogation signal will be identical in form but not necessarily amplitude for all interrogators and for every interrogation transmission interval. Either signal will serve to trigger the response cycle of the transponders as described below.

The carrier oscillator frequency of the interrogation transmitter 1 is output to the decode/digital processor 14 for use in coherent demodulation of the received transponder and skin reflection signals.

The interrogation pulse generator 2 provides the timing for both the interrogator and the transponders that are within range and performs the function of keying the transmitter so that its output is modulated to form an interrogation signal that is essentially identical for all transponders and an address that is recognizable by all transponders. It also formats and sequences the messages that are to be transmitted to the transponders. These messages may originate in the decoder digital processor 14 or they may be data linked to the interrogator pulse generator from outside sources such as a traffic control center. Typically a different message will be sequenced to the interrogation transmitter 1 on each successive interpulse period. After all available messages have been transmitted, the interrogation pulse generator 2 sequences through the then available messages. Generally addresses and messages will not be sequenced to the interrogation transmitter 1 unless the associated transponder identifying code has been detected by the decoder/digital processor 14 and is therefore known to be within range of the interrogator.

The interval between interrogation signals may be programmable and may be varied as a function of time, and may vary from interrogator to interrogator.

Regardless of the interrogation timing sequence of the interrogation pulse generator 2, it will always transmit to the decode/digital processor 14, a precise measurement of the interpulse period, and of the timing of the interrogation pulse.

The signal transmitted by interrogator antenna 3 is received by a multiplicity of transponder antennas 4 and is amplified by transponder receiver 5. The amplified signal is transferred to transmitter 6, PRI generator 8 and message decoder 15.

In the transmitter 6 an oscillator may be locked to the receiver signal and its output combined with the spectrally pure output of the offset frequency generator 7. The offset frequency is essentially identical for all transponders. The resulting frequency is a spectrally pure signal that is offset from the interrogation transmitter frequency F1 by an amount sufficient to allow separation of the two signals in the interrogation receiver 12 and by the one-way doppler shift resulting from any relative velocity between the interrogator and the transponder.

Transmitter 6 output is normally gated off and remains so until a binary coded signal from the binary code generator 9 is received. When gated on the transmitter radiates through antenna 10. The binary code is unique for each transponding vehicle or other moveable device authorized to operate in the environment. The binary code consists of two elements as follows:

a—an identifying code which identifies the vehicle or other moveable device to which the transponder is attached. For example, for road traffic this may be the vehicle identification number (VIN).

b—a message code which includes information that is to be transmitted to an interrogator. These messages will generally originate outside the transponder as vehicle inputs. They may typically include requests for assistance, notification that the vehicle has been tampered with, stolen or hijacked, and any other requests or information that it is desirable to communicate to the outside world.

The transponder receiver 5 signal is operated on by the PRI generator 8. First the interrogation signals are stripped from the overall signal. Second, after a number N of these signals have been counted, the PRI generator 8 transmits a pulse to the binary code generator 9. This pulse is transmitted in synchronism with an interrogation signal. The binary code generator 9 is activated upon receipt of the pulse and starts the transmitter sequence described above. A new number N is then selected by the PRI generator.

There are many algorithms that will generate sequences of the number N that are useful in this invention, some of which are described in my U.S. Pat. No. 5,264,854 and in my application Ser. No. 07/941,716 filed Sep. 8, 1992. All such algorithms must meet the requirements that the resulting transponder response shall be in synchronism with particular interrogation pulses and an individual transponder that is illuminated by a given interrogator must generate number N sequences that are different from that of all other transponders that are similarly illuminated.

The transponder receiver 5 output is input to the message decoder 15 where the following functions are performed:

a—the address portion of the interrogator transmission is decoded and compared to the identification code of that particular transponder. If these two codes are not the same, the message is rejected. If these two codes are the same the information portion of the code is acted upon.

b—Where there is agreement between the address and the transponder identification code the information portion of transmission is formatted and output to the vehicle subsystems. Typically these will include at least a display visible to the driver of the vehicle which can convey information such as ROAD BLOCKED TWO THOUSAND FEET then later ROAD BLOCKED ONE THOUSAND FEET. Other typical messages that must be conveyed to the driver in real time might include STOP - POLICE or ROAD ICING. An output from the message decoder 15 might also be used to deactivate the ignition of a wanted vehicle so that it will stop without involving high speed police chase.

The signals received by antenna 11 include the transponder coded signal from antenna 10 and an interrogator signal that has been reflected by the vehicles or other movable devices, that is, the skin reflection signal. As noted in my previously related applications, the skin reflection will differ in frequency from the interrogation signal by plus or minus the two-way doppler shift while the transponder signal will differ by the offset frequency plus or minus the two-way doppler shift. These signals are amplified in interrogator receiver 12.

The functions of the decoder/digital processor 14 are best described by reference to FIGS. 3A, 3B and 3C showing typical time lines and the overall timing of the interrogator and transponder devices.

Referring to FIG. 3A, the interrogator transmission interrogation signal is substantially identical for all interrogators and all repetition intervals of a given interrogator. In the example shown, the interrogation signal will be transmitted 10,000 times per sec.

The interrogator message, consisting of an address and an information data block will change from repetition interval to repetition interval. In the example shown, 10,000 messages may be addressed to 10,000 different transponders within one second. If fewer messages are assigned to a given interrogator they will be transmitted more frequently as the interrogation pulse generator repeatedly sequences through the list of assignments.

Referring to FIG. 3B, the skin returns which are generated by reflection of the interrogation signal from fixed and moving objects will be received by antenna 11 at the same rate as the interrogation signal that is 10,000 times per second. These returns will be delayed in time and displaced in frequency depending on the range and velocity of the reflecting object. They may be divided into range increments and the resulting multiple range gated signals may, for example, be operating on by a conventional fourier transform filter to yield the range and velocity of reflecting objects at each range.

Referring to FIG. 3C, the transponder returns which are triggered by the interrogation signal will be from different transponders during each successive repetition interval or in many intervals there will be no transponder returns at all. Because of the probabalistic operation of PRI generators 8 there may be repetition intervals where two or more transponders will respond. If, for example, the PRI generators 8 operate with algorithms that randomize the number N so that a given transponder transmits an average to one in 500 interrogations then a given transponder return will be received 20 times per second assuming an interrogation pulse repetition rate of 10,000 per second. If there are, for example, 200 transponders within range of an interrogator, then only 4,000 of the available 10,000 interrogator intervals will on average be filled.

Useful transponder returns, that is returns that are from a single transponder, will be delayed in time as a function of that transponder's range; will be two-way doppler shifted with respect to the offset frequency as a function of the transponder velocity and will contain the identification and message code from the transponder.

Referring to FIG. 1 the offset frequency generator 13 is substantially identical to the offset frequency generators in the multiple transponders and function in the manner described in my application Ser. No. 07/941,716. Similarly the functions of the decoder/digital processor of FIG. 2 may be related to those of the same elements of that application with three distinctions.

a—transponder returns are processed to decode the transponder response so that the transponder identification and the transponder data are available for use in traffic, monitor and control algorithms.

b—skin returns are processed to independently yield both range and velocity of transponder and nontransponder equipped vehicles.

c—data processing in the display/data link/logic digital processor 19 results in the generation of messages to be addressed to specific transponders via the interrogation pulse generator 2.

Referring to FIG. 2, the message decoder 16 separates the skin reflection and transponder coded responses and checks the validity of the transponder codes. Codes may be rejected as invalid, for example, if they do not meet signal to noise ratio requirements, are excessively corrupted by the probablistic simultaneous reception of two or more transponder codes, do not show consistent ranges on successive responses, do not show consistent velocities on successive responses or are invalid for other reasons.

Codes that are deemed valid are separated into an identification code and an information data block. A separate file is initiated in the digital processor 19 for each different identification code received. The file logic enters in memory the identification code, the information data block and the time the code was received.

The doppler velocity conversion device 17 performs the function of combining the interrogator transmitter frequency signal and the interrogator offset frequency signal to produce a reference signal for measuring the doppler shift of the received transponder signals. The frequency difference between the reference signal and the transponder response is determined using conventional techniques. The filtered and scaled doppler frequency of each code is stored in the file for that particular code.

The time delay range conversion device 17 generates two range values, one based on the time difference between the interrogation signal time and the transponder response time and the other based on the time difference between the interrogation signal time and the skin reflection time.

Range to a particular transponder is determined by correcting the transponder response time for known time delays in the system and converting the resulting two-way travel time to range units. The resulting range value is transferred to the appropriate transponder code file.

Skin reflection radar times may be converted to range and velocity using a variety of coherent and noncoherent radar techniques. In the preferred implementation the coherent complex number skin returns are divided into small time interval range bins. The complex numbers representing the skin return in each bin are stored on successive pulse repetition intervals. Doppler filtering of a sequence of such returns using conventional techniques yields a data stream of skin return ranges and velocities. These are stored in a digital processor file with the associated time of measurement.

As time advances the digital processor 19 will build up files which contain the following data:

a—The transponder identification code of vehicles that have responded to interrogation;

b—The velocity of the vehicle carrying that particular code;

c—The distance to the vehicle carrying that code;

d—Messages transmitted as part of the transponder response associated with that vehicle's identification code.

e—The range and velocity of all vehicles within range of the interrogator whether transponder equipped or not.

The uses of this data and the software associated with generating outputs that will perform functions as diverse as opening the gates of a gated community for authorized vehicles, automatically collecting tolls, controlling traffic signals, stopping wanted vehicles, warning of impending crashes, and issuing traffic advisories will be the subject of future patent applications. In the context of these multiple uses, means must be provided which will allow the effective interrogation range of the interrogators and the response range of the transponders to be varied from a nominal 100 ft. to several miles. Conventional power management techniques can be used to limit the power level of the interrogators so that they will not activate transponders beyond a desired range. However, the power output of the transponders must also be controlled in order to avoid excessive interference between short range interrogators operating in close proximity.

To achieve this, means are provided in the interrogation pulse generator 2 for generating a data block in the interrogation message that is decoded by all transponder message decode elements 15 and is in turn transmitted to the transmitter where it serves to set the transponder power level. In a preferred embodiment, means are also provided in the transponder for adjusting the power level as a function of the received interrogation signal amplitude.

What is claimed and desired to be secured by Letters Patent is:

1. An interrogator transponder system for electronically interrogating and communicating with multiple closely spaced vehicles including at least one interrogating device which transmits a sequence of differing address and associated message digital codes, said codes being interleaved with a sequence of identical interrogation signals, said interrogating devices being located remotely from multiple vehicles and transponder means on the vehicles for receiving the interrogator signals decoding the message codes whose associated address code is identical to the transponder identifying code and responding to the interrogation signal at a time that is precisely synchronized with the interrogation signal after a number of interrogations have been received and means in the transponders to insure that each transponder responds to a difference sequence of interrogation signals after a plurality of interrogation signals have been received.

2. An interrogator transponder system according to claim 1 wherein, after a transponder response, means in the transponder cause the transponder to not respond to interrogation signals until n interrogation signals have been received where n is a random number greater than 2 and transponder means generate a new random number N after each response.

3. An interrogator transponder system according to claim 1 wherein the vehicle transponders include means for modulating each response with an identifying code that is unique to each vehicle transponder and means for modulating each response with a vehicle message code and means in the interrogation device for receiving the transponder response and means for associating each transponder response doppler derived velocity and each transponder response time delay derived range with the corresponding valid transponder identifying code and transponder message code.

4. An interrogator transponder system according to claim 3 wherein means in the transponders offset the transponders response carrier frequency by a precise amount with respect to the received interrogator carrier signal and means in the interrogators to offset the interrogator carrier frequency by an amount substantially identical to the transponders offset frequency and means in the interrogator for using the resulting offset frequency as a reference for measuring the doppler shift of the received transponder signals.

5. An interrogator transponder system according to claim 3 wherein means in the transponders offset the transponders response carrier frequency by a precise amount with respect to the received interrogator carrier signal and means in the interrogators to combine the received transponder signals with the output of an interrogator offset frequency generator means said offset frequency being substantially identical to the transponders offset frequency and means for determining the received signal doppler frequency by determining the frequency difference between the combined signal and the interrogator transmitter carrier signal used as a reference.

6. The interrogator and transponders of claim 4 wherein signal generation means generate coherent and essentially spectrally pure interrogator carrier frequency, transponder transmitter carrier signals, transponder offset frequency signals and interrogator offset frequency signal.

7. An interrogator and transponders of claim 4 wherein means essentially simultaneously determine the range and velocity of moveable objects by measuring the doppler shift and time delay of the moveable object interrogation signal skin returns and means for creating a time history of the moveable objects skin return derived range and velocity by storing successive values in a digital memory.

8. An interrogator transponder system according to claim 4 wherein programmable means determine the power level of the interrogator transmitter and programmable elements of the interrogator message code are decoded by transponder means and the resulting values used to determine the transponder power level.

* * * * *